United States Patent

[11] 3,609,178

[72] Inventor Robert N. Thomas
Midland, Mich.

[21] Appl. No. 881,289
[22] Filed Dec. 1, 1969
[45] Patented Sept. 28, 1971
[73] Assignee Dow Corning Corporation
Midland, Mich.

[54] KETOXIME SILOXANES CURABLE WITH AMINOORGANOSILANES
22 Claims, No Drawings

[52] U.S. Cl. .......... 260/46.5 G, 117/135.1 R, 260/33.6 SB, 260/37 SB, 260/46.5 E
[51] Int. Cl. .......... C08f 11/04
[50] Field of Search .......... 260/46.5 E, 46.5 G

[56] References Cited

UNITED STATES PATENTS

| | | | |
|---|---|---|---|
| 3,189,576 | 6/1965 | Sweet | 260/46.5 |
| 3,280,072 | 10/1966 | Frankland | 260/46.5 |
| 3,350,349 | 10/1967 | Hyde | 260/46.5 |
| 3,471,434 | 10/1969 | Pande et al. | 260/37 |

*Primary Examiner*—Donald E. Czaja
*Assistant Examiner*—M. I. Marquis
*Attorneys*—Robert F. Fleming, Jr., Laurence R. Hobey, Harry D. Dingman and Roger H. Borrousch

ABSTRACT: Ketoxime functional siloxane polymers are mixed with aminoorganoalkoxysilanes to provide a composition which cures at room temperature by exposure to moisture and is stable in the absence of moisture. The composition cures to a material which has improved adhesion to substrates, such as metal, is harder and has improved solvent resistance. The composition can be used as a protective film, such as paint or varnish.

KETOXIME SILOXANES CURABLE WITH AMINOORGANOSILANES

This invention relates to a room temperature vulcanizable organosilicon composition.

The ketoxime functional organosiloxane polymers are known in the art as described in U.S. Pat. No. 3,189,576 and U.S. Pat. No. 3,184,427. U.S. Pat. No. 3,189,576, which is hereby incorporated by reference, describes ketoxime functional organosiloxanes which are useful in the present invention.

Although it is known from U.S. Pat. No. 3,189,576 to use organoamines as catalysts in curing the ketoxime compounds, it is totally unexpected that certain amine bearing alkoxysilanes would provide improved adhesion to metals such as aluminum, and also provide cured film with excellent solvent resistances compared to equivalent ketoxime compounds cured with organoamines. It is therefore an object of the present invention to provide a room temperature vulcanizable ketoxime siloxane composition which has improved adhesion to metal and improved solvent resistance.

This invention relates to a room temperature vulcanizable composition which is stable in the absence of moisture but cures upon exposure to moisture consisting essentially of (A) an organosiloxane polymer having at least 30 mol percent of siloxane units selected from the group consisting of monoorganosiloxane units, $SiO_2$ units and mixtures thereof and any remaining siloxane units being selected from the group consisting of diorganosiloxane units, triorganosiloxane units and mixtures thereof, said mol percent being based on the total number of siloxane units in the organosiloxane polymer, said organosiloxane polymer having an average of from 0.8 to 1.7 organic groups per silicon atom, said organic groups being monovalent organic radicals selected from the group consisting of hydrocarbon radicals, halogenated hydrocarbon radicals and cyanoalkyl radicals, and said organosiloxane polymer having siloxane endblocking units wherein each such siloxane endblocking unit has per silicon atom from 1 to 3 inclusive ketoxime radicals of the formula $-O-N=X$ where the oxygen atom is bonded to the silicon atom and X is selected from the group consisting of radicals of the formula $R_2C=$ and

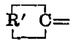

in which each R′ is selected from the group consisting of divalent hydrocarbon radicals and halogenated divalent hydrocarbon radicals and each R is a radical selected independently from the group consisting of monovalent hydrocarbon radicals and halogenated monovalent hydrocarbon radicals, said ketoxime radicals being present in an amount sufficient to provide from 5 to 68 weight percent based on the total weight of the organosiloxane polymer, and (B) an aminoorganosilane of the formula $Z_a-R''-SiR'''_xQ_{3-x}$ wherein R″ is a hydrocarbon radical selected from the group consisting of divalent hydrocarbon radicals and trivalent hydrocarbon radicals having from 1 to 30 inclusive carbon atoms per radical, R‴ is a monovalent hydrocarbon radical having from 1 to 30 inclusive carbon atoms per radical, Q is an alkoxy radical having from 1 to 5 inclusive carbon atoms per radical, *x* is an integer of from 0 to 2 inclusive, *a* is an integer of from 1 to 2 inclusive where *a* is 1 when R″ is divalent and *a* is 2 when R″ is trivalent and Z is an amine radical selected from the group consisting of

wherein each $R^{iv}$ is selected from the group consisting of a hydrogen atom and R‴, $R^v$ is a divalent hydrocarbon radical having from 1 to 10 inclusive carbon atoms, $R^{vi}$ is a divalent radical selected from the group consisting of $-R^v-$ having from 3 to 10 inclusive carbon atoms and

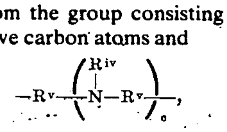

and *c* is an integer of from 1 to 5 inclusive, said aminoorganosilane (B) being present in an amount sufficient to provide from 0.1 to 5 weight percent based on the weight of (A).

The organosiloxane polymers of the composition of the present invention are resinous type organosiloxanes. The organosiloxane polymers have at least 30 mol percent siloxane units selected from monoorganosiloxane units or $SiO_2$ units. Any remaining siloxane units in the organosiloxane polymer are selected from diorganosiloxane units and triorganosiloxane units. The organosiloxane polymers have a ratio of silicon-bonded monovalent organic radicals per silicon atom of from 0.8 to 1.7 inclusive preferably from 1 to 1.5 inclusive. The mol percentages of the siloxane units in the organosiloxane polymer are based on the total number of siloxane units in the organosiloxane polymer.

The monovalent organic radical can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclophentyl, cyclohexyl, cycloheptyl, propyl-cyclohexyl, 2,4-dimethylcyclopentyl, cyclohexenyl, bicyclo[3.1.0]hexyl, tricyclo[3.2.1.1 3,8]-5-nonenyl, spiro-[4.5]decyl, dispiro[4.1.4.2]1-tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9′-bifluoryl and 4m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

The monovalent organic radical can also be any monovalent halogenated hydrocarbon group such as aliphatic groups such as chloromethyl, 3-chloropropyl, 3,3,3-trichloropropyl, perfluorovinyl, chlorooctadecyl or radicals of the formula $R_fCH_2CH-$ where $R_f$ can be any perfluoroalkyl group such as trifluoromethyl, perfluoroethyl, perfluoroisobutyl, perfluoroheptyl or perfluorooctadecyl; aromatic groups such as dichlorophenyl, tetrabromoxenyl, tetrachlorophenyl, alpha,alpha,alpha-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)ethyl or beta-(bromophenyl)propyl.

The monovalent organic radical can also be any cyanoalkyl radical such as, beta-cyanoethyl, gamma-cyanopropyl, gamma-cyanobutyl and omega-cyanooctadecyl.

The monoorganosiloxane units can be illustrated by methylsiloxane, ethylsiloxane, propylsiloxane, isopropylsiloxane, butylsiloxane, isopentylsiloxane, hexylsiloxane, dodecylsiloxane, octadecylsiloxane, 3-methylheptylsiloxane, vinylsiloxane, hexenylsiloxane, 4,9-octadecadienylsiloxane, propynylsiloxane, decynylsiloxane, cyclohexylsiloxane, spiro[4.5]decylsiloxane, phenylsiloxane, tolylsiloxane, xylylsiloxane, xenylsiloxane, naphthylsiloxane, benzylsiloxane, 2-phenylpropylsiloxane, chloromethylsiloxane, 3,3,3-trifluoropropylsiloxane, chlorooctadecylsiloxane, bromocyclopentylsiloxane, dichlorophenylsiloxane, gamma-cyanopropylsiloxane and omega-cyanooctadecylsiloxane.

The diorganosiloxane units can be illustrated by dimethylsiloxane, diethylsiloxane, diphenylsiloxane, phenylmethylsiloxane, methylvinylsiloxane, ethylmethylsiloxane, 3,3,3-trifluoropropylmethylsiloxane, methylcyclohexylsiloxane, dihexylsiloxane, methylnaphthylsiloxane, ethyldecynylsiloxane, methylallylsiloxane, methylxenylsiloxane, methyl-(2-phenylpropyl)siloxane, and gamma-propylmethylsiloxane.

The triorganosiloxane units can be illustrated by trimethylsiloxane, triethylsiloxane, triphenylsiloxane, methylphenylvinylsiloxane, octadecyldimethylsiloxane, ethylphenylvinylsiloxane, cyclohexyldimethylsiloxane, 3,3,3-trifluoropropyldimethylsiloxane and gamma-cyanopropyldimethylsiloxane.

The organosiloxane polymer can contain any of the siloxane units illustrated above or any siloxane unit having the monovalent organic radicals as illustrated, as long as, there is present at least 30 mol percent monoorganosiloxane units or $SiO_2$ units and the monovalent organic radical to silicon atom ratio is from 0.8 to 1.7 inclusive. These organosiloxane polymers are well known in the art and can be purchased commercially.

The organosiloxane polymers of the composition of the present invention are endblocked with ketoxime radicals. The organosiloxane polymer, as described above, is preferably a hydroxylated organosiloxane polymer or a halogenated organosiloxane polymer.

The hydroxylated or halogenated organosiloxane polymer is then endblocked with ketoxime radicals as described in U.S. Pat. No. 3,189,576.

Oximes can be reacted with the halogenated organosiloxane polymers whereby the ketoxime organosiloxane polymer is obtained or the oximes can be reacted with chlorosilanes to provide ketoxime silanes which can then be partially hydrolyzed to provide the ketoxime organosiloxane polymers or the ketoxime silanes can be reacted with hydroxylated organosiloxane polymers to provide the ketoxime organosiloxane polymers. Additional details for the preparation of the organosiloxane polymers with ketoxime functionality can be found in U.S. Pat. No. 3,189,576.

The oximes can be, for example, acetophenone oxime, acetone oxime, benzophenone oxime, 2-butanone oxime, 3-methyl-2-butanone oxime, d-camphor oxime, alpha-d-carvone oxime, 2-nonanone oxime, 5-methyl-2-hexanone oxime, 2-penanone oxime, diisopropylketone oxime, cyclopentanone oxime, cyclohexanone oxime, acrylophenone oxime, 1-acetonaphthone oxime, 1-phenyl-2-butanone oxime, chlorocyclohexanone oxime, perfluorocyclobutanone oxime, 4-phenyl-2-butanone oxime, 5-isopropyl-2-methylacetophenone oxime, 12-tricosanone oxime, alpha-bromo-2,4,6-trimethylisobutyrophenone oxime, anthrone oxime, p-chloroacetophenone oxime and p-alpha-dibromoacetophenone oxime.

The ketoxime endblocking radicals are on siloxane units wherein the general formula of a unit would be $$(X{=}NO)_dSiR_bO_{\frac{4-b-d}{2}}$$

in which $d$ is an integer of 1 to 3 inclusive, $b$ is an integer of 0 to 2 inclusive, the sum of $d$ and $b$ is not greater than 3. The ketoxime radical $-ON{=}X$ is bonded to the silicon atom through the oxygen atom and X is selected from the radicals of the formula $R_2C{=}$ and

in which each R' is a divalent hydrocarbon radical or a halogenated divalent hydrocarbon radical and each R is a radical independently selected from monovalent hydrocarbon radicals or halogenated monovalent hydrocarbon radicals. Examples of R are illustrated above for monovalent organic radicals. R' can be any divalent hydrocarbon radical or divalent halogenated hydrocarbon radical in which the two valences are attached to the C of the $C{=}NO-$ group. For example, R' can be $-CH_2(CH_2)_3CH_2-$, $-CH_2(CH_2)_4CH_2$,

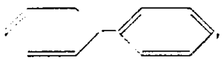, $-CH_2CH(CH_3)CH(CH_3)CH_2CH_2-$ $-CH_2CHClCH_2CH_2CH_2-$, 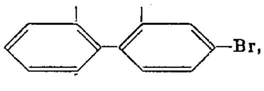, $-CF_2(CF_2)_3CF_2-$, $-CF_2(CF_2)_2CF_2-$ and

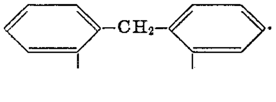

The ketoxime radicals are present in an amount sufficient to provide from 5 to 68 inclusive weight percent based on the total weight of the organosiloxane polymer. Preferably, the ketoxime radical is present in an amount to provide from 10 to 50 inclusive weight percent.

Illustrative examples of organosiloxane polymers useful in the present invention can be found in U.S. Pat. No. 3,189,576.

The aminoorganosilane of the composition of the present invention has a formula $Z_a-R''-SiR'''_xQ_{3-x}$ wherein R'' is a hydrocarbon radical selected from divalent hydrocarbon radicals and trivalent hydrocarbon radicals having from 1 to 30 inclusive carbon atoms, R''' is a monovalent hydrocarbon radical having from 1 to 30 inclusive carbon atoms per radical, as exemplified above for the monovalent organic radicals, Q is an alkoxy radical of 1 to 5 carbon atoms per radical such as methoxy, ethoxy, propoxy, isopropoxy, butoxy and pentoxy; $x$ is an integer of from 0 to 2 inclusive, $a$ is an integer of from 1 to 2 inclusive and Z is an amine radical selected from $-NR_2^{iv}$,

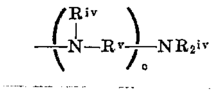 and 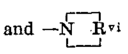

In the formula, $a$ is 1 when R'' is divalent and $a$ is 2 when R'' is trivalent.

The divalent hydrocarbon radicals of R'' can be, for example, $-C_mH_{2m}-$, where $m$ is 1 to 30 such as methylene, dimethylene, trimethylene, octadecamethylene and tricontamethylene, phenylene, tolylene, xenylene, naphthylene, propenylene, ethylidene, isopropylidene, cyclohexylene, $-CH_2C_6H_4CH_2-$, $-CH_2C_6H_4CH_2CH_2-$, $-CH_2C_6H_4(CH_2)_{20}-$, and $-CH_2C_6H_4-$.

The trivalent hydrocarbon radicals of R'' can be, for example,

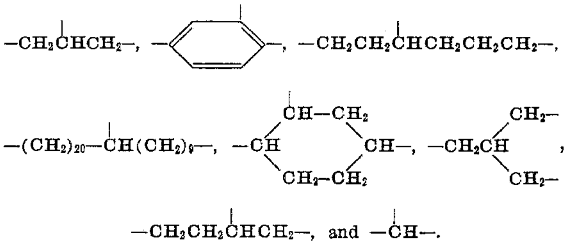

The amine radical can be $-NR_2^{iv}$ where each $R^{iv}$ can be a hydrogen atom or a R''' radical as defined above. For example, $-NR_2^{iv}$ can be $-NH_2$, $-NH(CH_3)$, $-NH(CH_2CH_3)$, $-NH(C_6H_5)$, $-NH[CH(CH_3)_2]$, $-NH(C_4H_{11})$, $-NHCH_2C_6H_5$, $-NH(CH_2)CH_3$, $-N(CH_3)_2$, $-N(CH_2CH_3)_2$, $-N(C_6H_5)_2$, $-N(CH_3)(CH_2CH_3)$, $-N(CH_3)(C_6H_5)$, and $-N(CH_3)[(CH_2)_{29}H_3]$.

The amine radical can be

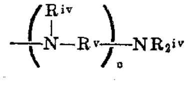

in which $R^v$ is a divalent hydrocarbon radical having from 1 to 10 inclusive carbon atoms, $R^{iv}$ is defined above, and $c$ is an integer of from 1 to 5 inclusive. The divalent hydrocarbon radical $R^v$ can be illustrated by methylene, dimethylene, trimethylene, tetramethylene, pentamethylene, hexamethylene, heptamethylene, octamethylene, nonamethylene, decamethylene, phenylene, $-CH_2C_6H_4-$, $-CH_2C_6H_4CH_2CH_2-$, tolylene, $-CH_2CH_2CH{=}CHCH_2-$ and $-CH_2CH(CH_3)CH_2-$. For example, $$-\left(\overset{R^{iv}}{\overset{|}{N}}-R^{v}\right)_c-NR_2^{iv}$$

can be $-NHCH_2CH_2NH_2$, $-NHC_6H_4N(CH_3)_2$, $-NHCH(CH_3)CH_2NH_2$, $-N(CH_3)(CH_2)_6NH(CH_3)$, $-NH(CH_2)_6NH_2$, $-NHCH_2CH_2NHCH_2CH_2NH_2$, $-NH(CH_2)_{10}NH_2$ and $$-\left(NHCH_2CH_2\right)_5-NH_2$$

The amine radical can be

wherein $R^{vi}$ is a divalent radical selected from $-R^{v}-$ having 3 to 10 inclusive carbon atoms and $$-R^{v}-\left(\overset{R^{iv}}{\overset{|}{N}}-R^{v}\right)_c-$$

where $R^{v}$, $R^{iv}$ and $c$ are defined aboved. For example,

can be

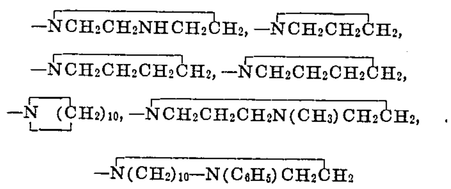

and

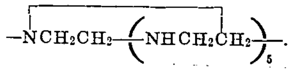

The aminoorganoalkoxysilanes are known in the art and additional discussion can be found in U.S. Pat. No. 2,754,311, No. 2,832,754, No. 2,971,864, No. 3,171,851 and No. 3,234,178. Illustrative of the aminoorganosilanes of the formula $Z_a-R''-SiR'''_xQ_{3-x}$ are p-aminomethylphenyl(methyl)diethoxysilane, p-aminomethylphenyl(dimethyl)ethoxysilane, aminomethyltriethoxysilane, gamma-aminopropyltrimethoxysilane, gamma-aminopropyltriethoxysilane, $(CH_3O)_3Si(CH_2)_3NHCH_2CH_2NH_2$, $(CH_3CH_2O)_3Si(CH_2)_3NHCH_2CH_2NH_2$, gamma-aminopropyltripropoxysilane, gamma-aminopropylmethyldiethoxysilane, N-methyl-p-aminomethylphenyltriethoxysilane, N-methyl-N-phenyl-p-aminomethylphenyl(phenyl)dipentoxysilane, $(CH_3O)_3SiCH_2CH(CH_3)CH_2NHCH_2CH_2NH_2$, $(CH_3O)_3SiCH=CHCH_2NHCH_2CH_2NH_2$, $(CH_3O)_3SiCH_2CH=CHCH_2CH_2NHCH_2CH_2NH_2$, gamma-aminopropylethyldiethoxysilane, gamma-aminopropylphenyldiethoxysilane, delta-aminobutyltriethoxysilane, m-aminomethylphenyltriethoxysilane, m-aminomethylphenyl(methyl)diethoxysilane, m-aminomethylphenyl(dimethyl)ethoxysilane, delta-aminobutylmethyldiethoxysilane, delta-aminobutylethyldiethoxysilane, $(CH_3O)_2Si(CH_3)(CH_2CH_2CH_2NHCH_2CH_2NH_2)$,

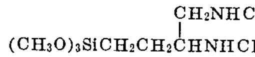

$(CH_3O)_3SiCH_2CH(CH_2NHCH_2CH_2NH_2)_2$,
$(CH_3CH_2O)_3SiCH_2CH_2CH_2C_6H_4CH_2NH_2$,
$(CH_3CH_2O)_3SiCH_2CH_2CH_2C_6H_4CH_2NH_2$,
$(CH_3CH_2O)_3SiCH_2CH_2C_6H_4CH_2NH_2$,
$(CH_3O)_3SiCH_2CH_2CH_2NHCH_2CH_2NHCH_2CH_2NH_2$
$(CH_3O)_3SiCH_2CH_2CH_2NH(CH_2)_6NH_2$,
delta-aminobutylphenyldiethoxysilane,
p-aminomethylphenylmethyltriethoxysilane,

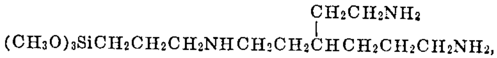

$(CH_3O)_3SiCH_2CH_2CH_2NH(CH_2)_3CH(CH_2CH_2NH_2)_2$,
$(CH_3O)_3SiCH_2CH_2CH_2N(CH_3)CH_2CH_2CH_2CH_2CH_2CH_2NH(CH_3)$,
$(CH_3O)_3SiCH_2CH_2CH_2NHCH_2CH(CH_3)NH_2$,
$(CH_3O)_3SiCH_2CH_2CH_2NHCH(CH_3)CH_2NH_2$,

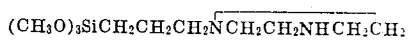

and $(CH_3O)_3SiCH_2NHC_6H_4N(CH_3)_2$.

The amount of the aminoorganosilane, (B), in the composition of the present invention is sufficient to provide from 0.1 to 5 weight percent based on the weight of the organosiloxane polymer, (A). Preferably the aminoorganosilane, (B), is present in an amount of from 0.5 to 2 weight percent.

The organosiloxane polymer, (A), having ketoxime functionality is mixed with the aminoorganosilane, (B), in the proper proportions to provide the limits as stated above. The mixing should be carried out under anhydrous conditions. The composition is stable in the absence of moisture, but readily cures upon exposure to moisture.

The composition of the present invention is particularly useful in providing protective coatings and films, such as pigmented paints and clear varnishes. The composition can be mixed with the conventional fillers and pigments used in paints to provide an air drying paint which has excellent adhesion to metal and particularly to aluminum and which is solvent resistant. In addition to the fillers and pigments, other additives such as organic solvents and antioxidants, among others conventionally used in paints or protective coatings, can be added.

The following examples are presented only for illustrative purposes and should not be construed as limiting the present invention which is properly delineated in the claims.

EXAMPLE 1

A mixture of 100 parts by weight of a hydroxylated organosiloxane resin consisting of 15 mol percent monomethylsiloxane units, 35 mol percent monophenylsiloxane units, 10 mol percent diphenylsiloxane units and 40 mol percent dimethylsiloxane units and 26 parts by weight of methyltri(methylethylketoxime)silane was prepared and allowed to react for 2 hours at room temperature producing a ketoxime functional organosiloxane resin having no detectable silicon-bonded hydroxyl radicals. The ketoxime functional organosiloxane resin was divided into five portions. To each portion, 1.0 weight percent of an amine was added as shown in table I. The resulting mixture of each amine containing ketoxime functional organosiloxane resin was applied to aluminum test panels to provide a 2-mil thick cured film. The test panels were cured by exposure to air at room temperature for 16 hours. The test panels were then tested for pencil hardness, crosscut adhesion and xylene resistance.

Pencil hardness was determined by squaring the lead of a pencil of appropriate hardness, holding the pencil at about 45° and then pushing the pencil forward against the coated panel using pressure just short of breaking the lead (wood of pencil removed from lead to expose about 0.25 inch of lead). The hardness value is the next lower grade that does not cut the film. The hardness of the pencils have a scale 2B, B, HB, F, H, 2H, 4H, 6H(hardest).

Crosscut adhesion was determined by crosscutting the coating on a test panel with a Bly-Gulden standard six-bladed crosscut tester, which provided 25 equal size squares. An attempt was then made to remove the 25 squares with Scotch tape. Each square which was removed was equal to 4 percent of the total crosscut area. If no squares were pulled off by the tape the adhesion was recorded as 100 percent. This value was reduced by 4 percent for each square removed.

The xylene resistance was determined by placing three drops of xylene on a coated panel. The time for the xylene to penetrate the coating and wrinkle the film was observed. n The end point was very sharp.

A. A monophenylsiloxane resin having 68 weight percent $-O-N=C(CH_3)(CH_2CH_3)$ radicals.

B. An organosiloxane resin having 20 mol percent monomethylsiloxane, 20 mol percent $SiO_2$ units and 60 mol percent monophenylsiloxane units and having 50 weight percent $-O-N=C(CH_3)_2$ radicals.

C. An organosiloxane resin having 5 weight percent $-O-N=C(C_6H_5)(CH_2CH_2CH_3)$ radicals and having 35 mol percent phenylmethylsiloxane units, 15 mol percent monotolylsiloxane units, 20 mol percent diethylsiloxane units, 15 mol percent monovinylsiloxane units, and 15 mol percent diphenylsiloxane units.

D. An organosiloxane resin having 15 mol percent trimethylsiloxane units, 10 mol percent $SiO_2$ units, 50 mol percent monoisopropylsiloxane units, 20 mol percent monophenylsiloxane units and 5 mol percent mono-octadecylsiloxane units, and having 10 weight percent

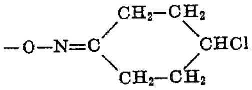

radicals.

TABLE I

| Composition | Amine | Pencil hardness | Cross cut adhesion, percent | Xylene resistance, sec. |
|---|---|---|---|---|
| A | None (control) | 2B | 0 | 8 |
| B | n-Hexylamine* | 2B | 8 | 3 |
| C | Triethylamine* | 2B | 8 | 7 |
| D | $(CH_3O)_3Si(CH_2)_3NHCH_2CH_2NH_2$ | F | 100 | 356 |
| E | $(CH_3CH_2O)_3SiCH_2CH_2CH_2NH_2$ | F | 100 | 480 |

*For comparative purposes of organic amines.

EXAMPLE 2

Equivalent results were obtained when example 1 was repeated using a hydroxylated organosiloxane resin having 15 mol percent monophenylsiloxane units, 50 mol percent phenylmethylsiloxane units, 25 mol percent monomethylsiloxane units and 10 mol percent diphenylsiloxane units.

EXAMPLE 3

A mixture of 1059.3 g. of a hydroxylated organosiloxane resin having 45 mol percent monomethylsiloxane units, 40 mol percent monophenylsiloxane units, 10 mol percent diphenylsiloxane units and 5 mol percent phenylmethylsiloxane units in 1927.2 g. of xylene and 225.0 g. of a monomethyldiacetoxysiloxy endblocked polydimethylsiloxane having an average of 34 dimethylsiloxane units per molecule was refluxed for 2 hours whereby a hydroxylated organosiloxane block copolymer was obtained. To the hydroxylated organosiloxane block copolymer, 411.0 g. of methyltri(methylethylketoxime)silane was added and the mixture was allowed to react for about 2 hours whereby a ketoxime functional organosiloxane block copolymer was obtained. The volatiles in the amount of 645.0 g. were removed by distillation. The resulting xylene solution was 49.7 weight percent ketoxime functional organosiloxane block copolymer. Test panels were coated as described in example 1 with mixtures of the ketoxime functional organosiloxane block copolymer and $(CH_3O)_3Si(CH_2)_3NHCH_2CH_2NH_2$ . The $(CH_3O)_3Si(CH_2)_3NHCH_2H_2NH_2$ was added in amounts of 0.0, 0.26, 0.53, 0.80, 1.10, 2.10 and 4.00 weight percent based on the weight of the ketoxime functional organosiloxane block copolymer. The xylene resistance, as described above, was greater than 7 hours in all cases except the coating containing no $(CH_3O)_3Si(CH_2)_3NHCH_2CH_2NH_2$ in which the xylene resistance was 5 seconds.

EXAMPLE 4

When any one of the following ketoxime functional organosiloxane resins is substituted for the ketoxime functional organosiloxane resin of example 1, equivalent results are obtained.

EXAMPLE 5

When any one of the following aminoorganosiloxanes is substituted for $(CH_3O)_3Si(CH_2)_3NHCH_2CH_2NH_2$ of example 1, equivalent results are obtained.

A. 0.1 weight percent of N-methyl-p-aminomethylphenyltriethoxysilane,

B. 0.5 weight percent of $(CH_3O)_2Si(CH_3)(CH_2CH_2CH_2NHCH_2CH_2h_2)$,

C. 2.0 weight percent of $(CH_3O)_3SiCH=CHCH_2NHCH_2CH_2NH_2$,

D. 5.0 weight percent of $(CH_3O)_3SiCH_2CH_2CH_2\overline{NCH_2CH_2NHCH_2CH_2}$, E. 1.0 weight percent of p-aminomethylphenyl(dimethyl)ethoxysilane, F. 3.0 weight percent of N-methyl-N-phenyl-p-aminomethylphenyl(phenyl)dipentoxysilane, G. 1.7 weight percent of $(CH_3O)_3SiCH_2CH_2CH_2N(CH_3)CH_2CH_2CHCH_2CH_2CH_2CH_2NH(CH_3)$.

That which is claimed is:

1. A room temperature vulcanizable composition which is stable in the absence of moisture but cures upon exposure to moisture consisting essentially of (A) an organosiloxane polymer having at least 30 mol percent of siloxane units selected from the group consisting of monoorganosiloxane units, $SiO_2$ units and mixtures thereof and any remaining siloxane units being selected from the group consisting of diorganosiloxane units, triorganosiloxane units and mixtures thereof, said mol percent being based on the total number of siloxane units in the organosiloxane polymer, said organosiloxane polymer having an average of from 0.8 to 1 ˜ organic groups per silicon atom, said organic groups being monovalent organic radicals selected from the group consisting of hydrocarbon radicals, halogenated hydrocarbon radicals and cyanoalkyl radicals, and said organosiloxane polymer having siloxane endblocking units wherein each siloxane endblocking unit has per silicon atom from 1 to 3 inclusive ketoxime radicals of the formula $-O-N=X$ where the oxygen atom is bonded to the silicon atom and X is selected from the group consisting of radicals of the formula $R_2C=$ and

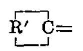

in which each R' is selected from the group consisting of divalent hydrocarbon radicals and halogenated divalent hydrocarbon radicals and each R is a radical selected independently from the group consisting of monovalent hydrocarbon radicals and halogenated monovalent hydrocarbon radicals, said ketoxime radicals being present in an amount sufficient to provide from 5 to 68 weight percent based on the total weight of the organosiloxane polymer, and (B) an aminoorganosilane of the formula $Z_a-R''-SiR'''_xQ_{3-x}$ wherein R'' is a hydrocarbon radical selected from the group consisting of divalent hydrocarbon radicals and trivalent hydrocarbon radicals having from 1 to 30 inclusive carbon atoms per radical, R''' is a monovalent hydrocarbon radical having from 1 to 30 inclusive carbon atoms per radical, Q is an alkoxy radical having from 1 to 5 inclusive carbon atoms per radical, $x$ is an integer of from 0 to 2 inclusive, $a$ is an integer of from 1 to 2 inclusive where $a$ is 1 when R'' is divalent and $a$ is 2 when R'' is trivalent and Z is an amine radical selected from the group consisting $-NR_2^{iv}$, 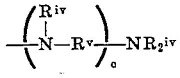 and 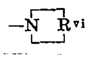

wherein each $R^{iv}$ is selected from the group consisting of hydrogen atom and R''', $R^v$ is a divalent hydrocarbon radical having from 1 to 10 inclusive carbon atoms, $R^{vi}$ is a divalent radical selected from the group consisting of $-R^v-$ having from 3 to 10 inclusive carbon atoms and

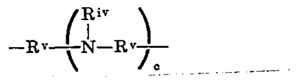

and $c$ is an integer of from 1 to 5 inclusive, said aminoorganosilane (B) being present in an amount sufficient to provide from 0.1 to 5 weight percent based on the weight of (A).

2. The room temperature vulcanizable composition of claim 1 in which the organic groups per silicon atom average of from 1 to 1.5 inclusive.

3. The room temperature vulcanizable composition of claim 1 in which the ketoxime radicals are present in amount sufficient to provide from 10 to 50 inclusive weight percent based on the total weight of the organosiloxane polymer.

4. The room temperature vulcanizable composition of claim 1 in which some of the organic groups are methyl radicals and the remaining organic groups are phenyl radicals.

5. The room temperature vulcanizable composition of claim 4 in which the organic groups per silicon atom average from 1 to 1.5 inclusive and the ketoxime radicals are present in an amount sufficient to provide from 10 to 50 inclusive weight percent.

6. The room temperature vulcanizable composition of claim 1 in which the aminoorganosilane is present in an amount sufficient to provide from 0.5 to 2 weight percent based on the weight of (A).

7. The room temperature vulcanizable composition of claim 5 in which the aminoorganosilane is present in an amount sufficient to provide from 0.5 to 2 weight percent based on the weight of (A).

8. The room temperature vulcanizable composition of claim 1 in which (B) is selected from the group consisting of $(CH_3O)_3SiCH_2CH_2NHCH_2CH_2NH_2$, $(CH_3CH_2O)_3SiCH_2CH_2CH_2NH_2$, $(CH_3O)_3SiCH_2CH(CH_3)CH_2NHCH_2CH_2NH_2$, and $(CH_3O)_2Si(CH_3)(CH_2CH_2CH_2NHCH_2CH_2NH_2)$.

9. The room temperature vulcanizable composition of claim 2 in which (B) is $(CH_3O)_3SiCH_2CH_2CH_2NHCH_2CH_2NH_2$.

10. The room temperature vulcanizable composition of claim 2 in which (B) is $(CH_3CH_2O)_3SiCH_2CH_2CH_2NH_2$.

11. The room temperature vulcanizable composition of claim 3 in which (B) is $(CH_3O)_3SiCH_2CH_2CH_2NHCH_2CH_2NH_2$.

12. The room temperature vulcanizable composition of claim 3 in which (B) is $(CH_3CH_2O)_3SiCH_2CH_2CH_2NH_2$.

13. The room temperature vulcanizable composition of claim 4 in which (B) is $(CH_3O)_3SiCH_2CH_2CH_2NHCH_2CH_2NH_2$.

14. The room temperature vulcanizable composition of claim 4 in which (B) is $(CH_3CH_2O)_3SiCH_2CH_2CH_2NH_2$.

15. The room temperature vulcanizable composition of claim 5 in which (B) is $(CH_3O)_3SiCH_2CH_2CH_2NHCH_2CH_2NH_2$.

16. The room temperature vulcanizable composition of claim 5 in which (B) is $(CH_3CH_2O)_3SiCH_2CH_2CH_2NH_2$.

17. The room temperature vulcanizable composition of claim 6 in which (B) is $(CH_3O)_3SiCH_2CH_2CH_2NHCH_2CH_2NH_2$.

18. The room temperature vulcanizable composition of claim 6 in which (B) is $(CH_3CH_2O)_3SiCH_2CH_2CH_2NH_2$.

19. The room temperature vulcanizable composition of claim 7 in which (B) is $(CH_3O)_3SiCH_2CH_2CH_2NHCH_2CH_2NH_2$.

20. The room temperature vulcanizable composition of claim 7 in which (B) is $(CH_3CH_2O)_3SiCH_2CH_2CH_2NH_2$.

21. The room temperature vulcanizable composition of claim 19 in which the ketoxime radical is $-O-N\ C(CH_3)(CH_2CH_3)$.

22. The room temperature vulcanizable composition of claim 20 in which the ketoxime radical is $-O-N\ C(CH_3)(CH_2CH_3)$.